United States Patent
Arsenault et al.

(10) Patent No.: US 7,120,923 B2
(45) Date of Patent: Oct. 10, 2006

(54) ELECTRONIC TELEVISION PROGRAM GUIDE DATA NAMING SYSTEM AND METHOD

(76) Inventors: Robert G. Arsenault, 2815 May Ave., Redondo Beach, CA (US) 90278; Kenneth D. Seibert, 2121 Ruhland Ave., Redondo Beach, CA (US) 90278; Tam T. Leminh, 4709 Montefino Dr., Cypress, CA (US) 90630

( * ) Notice: Subject to any disclaimer, the term of this patent is extended or adjusted under 35 U.S.C. 154(b) by 169 days.

(21) Appl. No.: 10/798,170

(22) Filed: Mar. 11, 2004

(65) Prior Publication Data

US 2004/0175120 A1   Sep. 9, 2004

Related U.S. Application Data

(63) Continuation of application No. 09/511,614, filed on Feb. 23, 2000, now Pat. No. 6,728,966.

(60) Provisional application No. 60/126,775, filed on Mar. 29, 1999.

(51) Int. Cl.
*G06F 3/00* (2006.01)
*G06F 13/00* (2006.01)
*H04N 5/445* (2006.01)
*H04N 7/173* (2006.01)
*H04N 7/16* (2006.01)

(52) U.S. Cl. .................... 725/39; 725/40; 725/44; 725/45; 725/49; 725/50; 725/52; 725/53; 725/134; 725/139; 725/142

(58) Field of Classification Search ........... 725/39, 725/44–47, 49–50, 52, 53, 134, 139, 142
See application file for complete search history.

(56) References Cited

U.S. PATENT DOCUMENTS

| | | | | |
|---|---|---|---|---|
| 4,829,569 A | * | 5/1989 | Seth-Smith et al. | 380/234 |
| 5,671,411 A | * | 9/1997 | Watts et al. | 725/43 |
| 5,686,954 A | * | 11/1997 | Yoshinobu et al. | 725/43 |
| 5,774,170 A | * | 6/1998 | Hite et al. | 725/34 |
| 5,798,785 A | * | 8/1998 | Hendricks et al. | 725/46 |
| 5,844,620 A | * | 12/1998 | Coleman et al. | 725/54 |
| 5,848,397 A | | 12/1998 | Marsh et al. | |
| 6,133,909 A | * | 10/2000 | Schein et al. | 715/721 |

(Continued)

FOREIGN PATENT DOCUMENTS

WO    WO 9712486 A1 * 4/1997

(Continued)

*Primary Examiner*—John Miller
*Assistant Examiner*—Michael W. Hoye

(57) ABSTRACT

Electronic television program guide information is downloaded, stored and searched by a local device. A plurality of linked lists are used to remove redundancy, increase search speed, and allow dynamic categories. When a new category is encountered a new head node for a link list data structure is created. When a first program guide object containing information related to that category is downloaded, a link is made (i.e., a pointer is stored) from the head node to the guide object. When subsequent program guide objects containing information related to that category are downloaded, links are added to the end of the list or inserted in alphabetical order. As guide objects expire the links are removed. When no links remain in a particular category the head node for that category is deleted.

20 Claims, 9 Drawing Sheets

U.S. PATENT DOCUMENTS

| | | | |
|---|---|---|---|
| 6,157,411 A * | 12/2000 | Williams et al. | 348/552 |
| 6,172,674 B1 * | 1/2001 | Etheredge | 715/721 |
| 6,216,265 B1 * | 4/2001 | Roop et al. | 725/54 |
| 6,240,555 B1 * | 5/2001 | Shoff et al. | 725/110 |
| 6,348,932 B1 * | 2/2002 | Nishikawa et al. | 715/719 |
| 6,426,779 B1 * | 7/2002 | Noguchi et al. | 348/569 |
| 6,460,181 B1 * | 10/2002 | Donnelly | 725/50 |
| 6,462,784 B1 * | 10/2002 | Kohno et al. | 348/563 |
| 6,481,010 B1 * | 11/2002 | Nishikawa et al. | 725/44 |

FOREIGN PATENT DOCUMENTS

WO     WO 97/41673     11/1997

* cited by examiner

ELECTRONIC TELEVISION PROGRAM GUIDE DATA NAMING SYSTEM AND METHOD

RELATED APPLICATIONS

This is a continuation of U.S. application Ser. No. 09/511,614 now U.S. Pat. No. 6,728,966, filed Feb. 23, 2000, which claims the benefit of the filing date of U.S. Provisional Application Ser. No. 60/126,775, filed on Mar. 29, 1999.

TECHNICAL FIELD OF THE INVENTION

The present invention relates in general to storing and retrieving information and in particular to storing and retrieving electronic television program guide data in a broadcast satellite system.

BACKGROUND OF THE INVENTION

Television signal distribution systems typically broadcast television signals to individual users or subscribers on a plurality of individual television channels. The channels may be modulated onto one or more carrier frequencies within a discernable frequency band. Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

The receiver unit receives and processes transmitted waveforms. The receiver unit in a satellite systems typically includes a satellite dish connected by a cable to an integrated receiver/decoder unit (IRD). The satellite dish is aimed toward the satellite, and the IRD is connected to the user's television in a similar fashion to a conventional cable-TV decoder.

Along with the audio and video signals associated with the television channels, the satellite transmits various files such as text and graphics. These files and portions of these files may be used by the IRD to provide the user with additional information such as supplements to an electronic program guide. For example, a file may describe a particular actor or identify a movie's director.

Typically, these files are stored in a relational database and retrieved by key fields. However, relational databases, particularly in an IRD environment, are slow and consume a large portion of RAM. Consequently, users must wait to retrieve program guide data and/or the cost of the IRD is increased by additional memory. Further, the names of the fields in the relational database (e.g., "director") are typically fixed. New categories of information cannot be easily added after the IRD has been shipped.

SUMMARY OF THE INVENTION

Accordingly, the present invention provides a method and apparatus for dynamically naming and storing data using linked lists which consumes less memory is faster than traditional techniques. Further, the present method and apparatus allows categories of information to be created and deleted as needed, even after the IRD is shipped.

In accordance with one aspect of the invention, an apparatus for storing digital content records used to create informational displays in an electronic television program guide is disclosed. The apparatus comprises a satellite receiver for receiving a first content record, a memory for storing the first content record, and a control circuit operatively coupled to the receiver and the memory. The control circuit determines if the first content record is new, and if the first content record is associated with a label, wherein the label categorizes the first content record. The control circuit also determines if the first content record is associated with a title, wherein the title categorizes the label. Further, the control circuit sets a reference pointer associated with the first content record pointing to a referencing display object; and sets a first content pointer associated with the first content record pointing to a second content record associated with the label.

The receiver may be a direct to home satellite receiver. In some embodiments, the control circuit creates a new title comprising an array of linked lists or a linked list of linked lists. In such an instance, the control circuit may insert a head node into a linked list indicative of the label, and set a second content pointer in the head node pointing to the first content record. Further, the control circuit may set a second content pointer in a third content record pointing to the first content record.

In accordance with another aspect of the invention, a method is disclosed for storing digital content records used to create informational displays in an electronic television program guide. The method begins by receiving a first content record from a satellite receiver and determining if the first content record is new. Subsequently, the method determines if the first content record is associated with a label, wherein the label categorizes the first content record. Further, the method determines if the first content record is associated with a title, wherein the title categorizes the label. Further, the method sets a reference pointer associated with the first content record pointing to a referencing display object, and sets a first content pointer associated with the first content record pointing to a second content record associated with the label.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Figure 1:
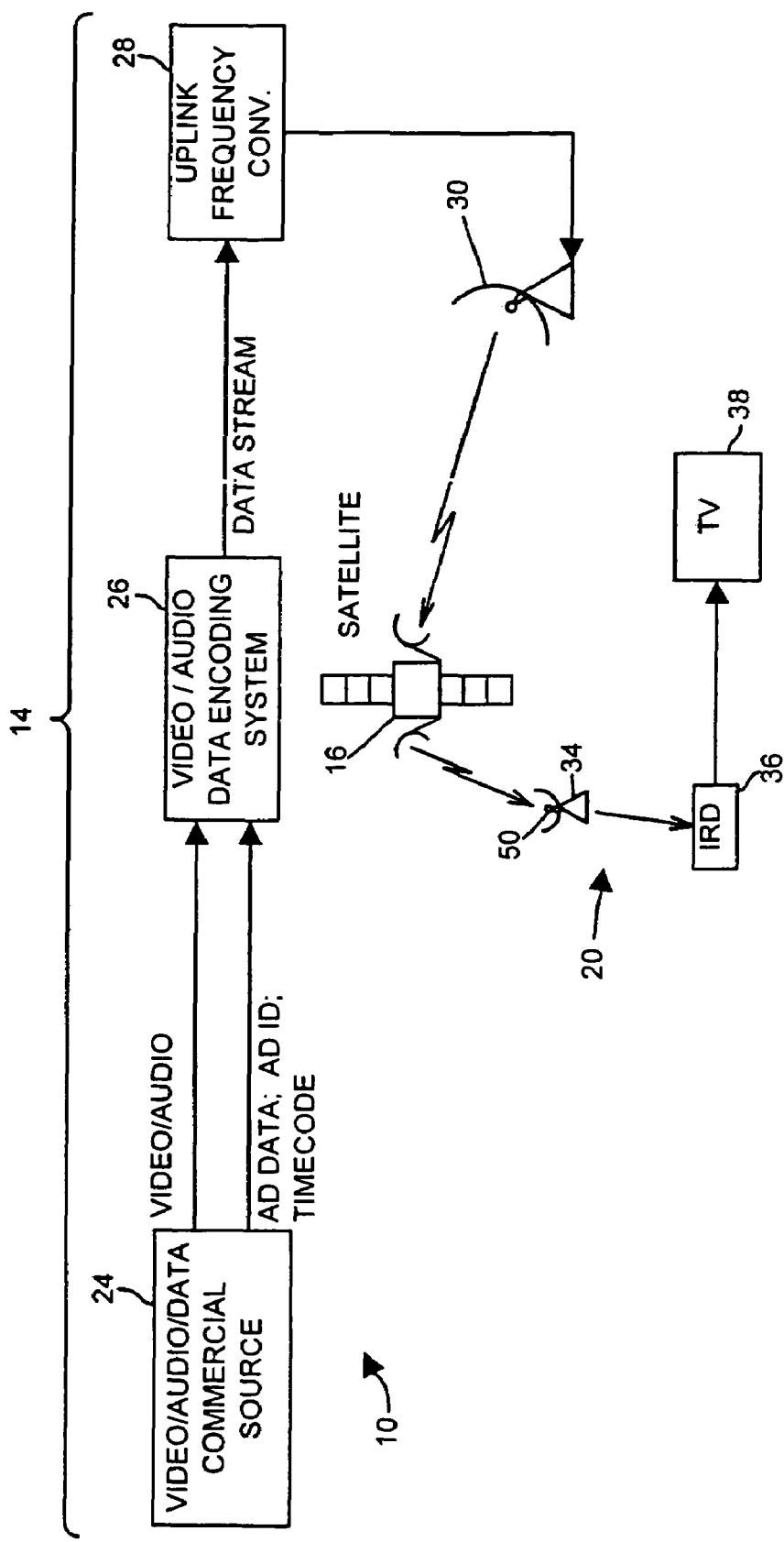
FIG. 1 is a block diagram of a direct broadcast satellite system that implements the method and apparatus of the present invention.

Although the following description focuses on the storage of content description for a satellite television program guide, persons of ordinary skill in the art will readily appreciate that the techniques of the present invention are in no way limited to satellite broadcasts or program guides. To the contrary, any system which might benefit from improved efficiency in memory usage, increased database search speed, and/or dynamic field names may employ the techniques shown herein.

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

Typically, such systems include a receiver for receiving and processing transmitted waveforms. One type of receiver is part of a "wireless digital television" system utilized by the DIRECTV® broadcast service. It and similar systems allow consumers to receive directly in their homes over 175 television channels broadcast from geosynchronous satellites. The receiver includes a small (e.g., 18-inch) satellite antenna (e.g., reflective dish and LNB) connected by a cable to an integrated receiver/decoder unit (IRD). The satellite antenna is aimed toward the satellites, and the IRD is connected to the user's television in a similar fashion to a conventional cable-TV decoder.

On the transmission side, video, audio, and related information data signals are digitally encoded into a packetized data stream using a number of algorithms, including convolutional error correction. The encoded data stream is then compressed to reduce bandwidth requirements, modulated to Ku-band frequency, transmitted to the satellite, and relayed from the satellite to the satellite antenna. The LNB (low noise block) of the satellite antenna shifts the Ku-band signal down to an L-band signal which is transmitted through the cable to the IRD.

In the IRD, front-end circuitry receives the L-band signal and converts it to the original digital data stream of video, audio, and related information signals. The digital data stream is fed to video/audio decoder circuits which perform the main video/audio processing functions such as demultiplexing and decompression. A micro-controller controls the overall operation of the IRD, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standards for performing digital video/audio compression.

Thus, the IRD unit typically includes an MEPG-1 and/or MEPG-2 video/audio decoder in order to decompress the received compressed video/audio.

The present invention is preferably embodied in a wireless distribution system that securely, reliably, and inexpensively distributes digital packetized video, audio, and data to individual users at geographically remote locations. The wireless distribution system is preferably implemented using the uplink and airlink facilities of a digital satellite television distribution system such as the system utilized by the DIRECTV® broadcast service. The present invention relates generally to a method and apparatus for receiving and storing program guide information related to broadcast entertainment-type data, such as packetized digital video, audio, and related information data received in a direct-to-home (DTH) system.

At a satellite uplink facility, video and audio signals may be digitized in known manners, multiplexed with other data signals, compressed (if required), mated with error correction codes, modulated on one or more carriers, and uplinked to a geosynchronous satellite. The satellite amplifies the received signal, shifts the signal to a different carrier frequency band and transmits (downlinks) the frequency shifted signal to earth for reception at individual receiver stations. A plurality of signals at different frequencies and/or polarizations are typically processed. Receiver stations, which are typically located at the user's dwelling, receive the satellite signals. The receiver stations include an antenna, which preferably is in the form of a satellite dish, along with an integrated receiver/decoder (IRD). The antenna feeds the received satellite signal to the IRD unit which recovers the originally transmitted digital video, audio, and data. In the preferred embodiment, the uplink and downlink broadband signals may be divided into a plurality of transponder signals, each having a plurality of individual channels.

Typically, the received packets are presented to a transport circuit that is in communication with a microprocessor. The microprocessor informs the transport circuit about which packets are of interest. For example, if the IRD is instructed by the user to display the ESPN station, the microprocessor instructs the transport to receive and process all packets (including particularly the video, audio and data packets) associated with the ESPN programming. The information about how to receive ESPN, or any other programming channel, is provided via the program guide data stream. In general, the program guide identifies (based on header information) those packets that must be assembled in order to construct the audio, video and data for any of the available programs. Program guide data also includes information needed to construct a graphical listing of the showtimes and channels for available programming, program description data, program rating data, program category data, and other data. The transport identifies desired ESPN packets by header information in the packet, strips off the payload portion of the packet, and forwards the payloads to an audio/video decoder (or optionally first to an intermediate storage location). The decoder then stores the payloads in designated memory locations. The ESPN video and audio payloads are then called up from their memory locations as needed, decoded, converted to NTSC analog signals, or a digital serial or parallel TV signal, and provided to a television monitor for display.

FIG. 1 is a block diagram of a transmission and reception system 10 embodying features of the present invention. The illustrated system 10 includes a transmission station 14, a relay 16, and a plurality of receiver stations, one of which is shown at reference numeral 20. A wireless airlink provides the communications medium between the transmission station 14, the relay 16, and the receiver station 20. The transmission station 14 includes a programming/data source 24, a video/audio/data encoding system 26, an uplink frequency converter 28, and an uplink satellite antenna 30.

The relay 16 is preferably at least one geosynchronous satellite. The receiver station 20 includes a satellite reception antenna 34 which may comprise a low-noise-block (LNB) 50, a receiver unit (or IRD) 36 connected to the LNB 50, and a television monitor 38 (or other output device) connected to the receiver unit 36.

In operation, the transmission station 14 can receive video and audio programming from a number of sources, including satellites, terrestrial fiber optics, cable, or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna 30 where it is broadcast toward the satellite 16 over the airlink. The satellite 16 receives the modulated, encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Figure 2:
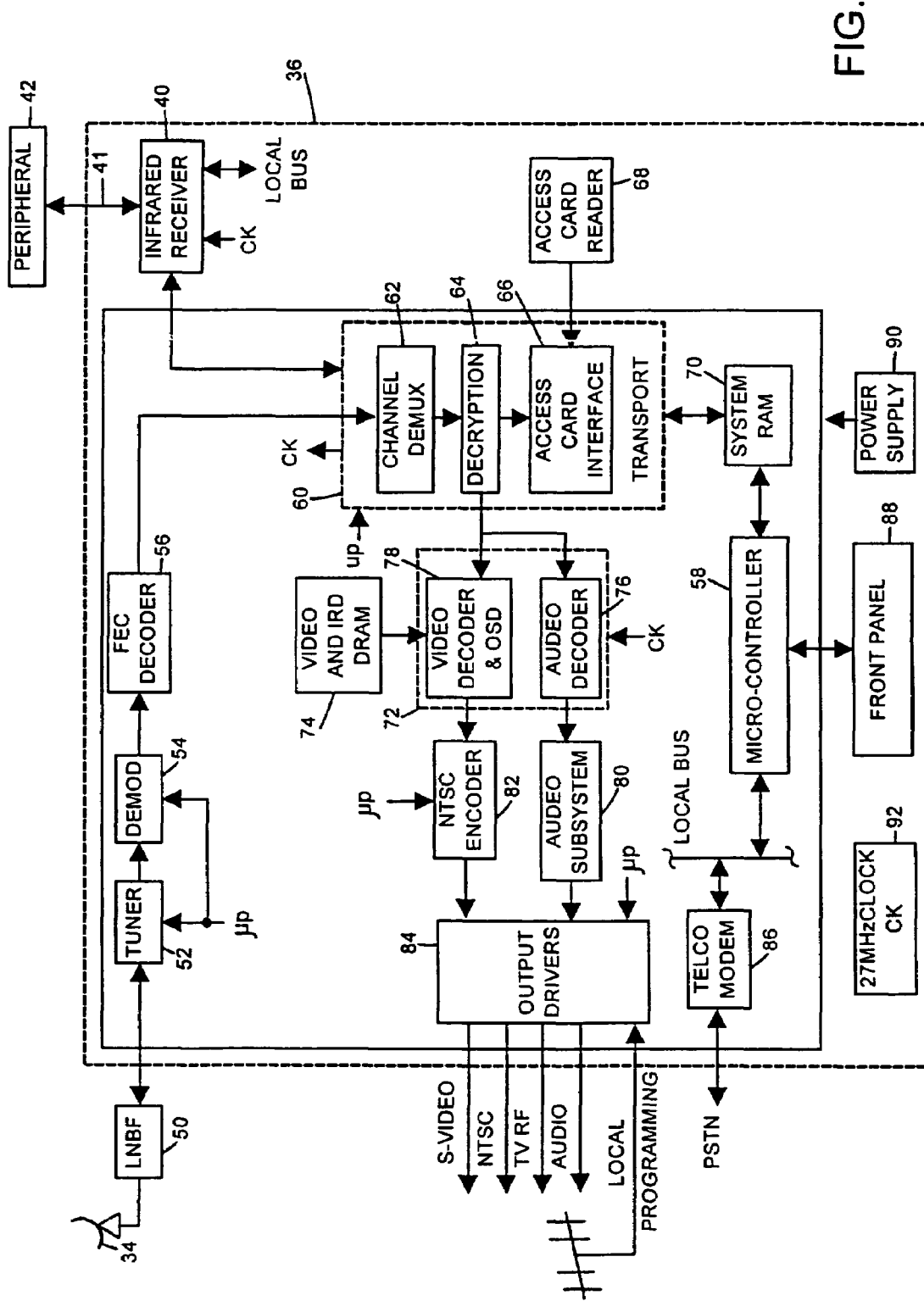
FIG. 2 is a block diagram illustrating more details of the receiver station of FIG. 1 embodying the present invention.

FIG. 2 is a more detailed block diagram of a portion of the receiver unit 36 shown in FIG. 1. Front-end circuitry inside the receiver unit 36 receives the L-band RF signals from the LNB 50 and converts them back into the original digital data stream. Decoding circuitry, receives the original data stream and performs video/audio processing operations such as demultiplexing and decompression. A microprocessor or CPU 58 controls the overall operation of the receiver unit 36, including the selection of parameters, the set-up and control of components, channel selection, and many other functions.

The receiver unit 36 includes an interface device 40, a peripheral 42, a tuner 52, demodulator 54, FEC decoder 56, a micro-controller 58, a transport circuit 60, a channel demultiplexer 62, decryption circuit 64, an access card interface 66, an access card reader 68, a system RAM 70, an audio/video decoder circuit 72 having a random-access-memory (RAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated. A 27 MHZ clock signal generator 92 is also provided. The clock generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. The digital packet information contains identifying headers as part of its overhead data. Under control of the micro-controller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

The authorized data of interest, which now consists of the payload portions of the received data packets, are forwarded to decoder DRAM 74 for buffering and may optionally be intermediately stored in system RAM 70. The audio/video decoder 72 decodes the payloads stored in DRAM 74, as needed. The requested data is routed from the RAM 70 through the transport 60 to the audio/video decoder 72. At that time, the data is routed to the video decoder 78 (which includes display generating circuitry) and the NTSC (or other) encoder 64. The video decoder 78 reads in the compressed video data from the DRAM 74, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 74. At a later time, the image is read out of the frame buffer in DRAM 74 and passed through the display circuitry to the encoder 82. The display circuitry (located in the video decoder 78) generates the graphics that allow text such as the electronic program guide data to be displayed. The encoder 78 converts the digital video signals to analog according to the NTSC standard or to other desired output protocols (e.g., ATSC), thereby allowing video to be received by a conventional television 38 or other video output device (FIG. 1).

In order to aide the user in navigating the content available on such a system, a television program guide may be generated. Preferably, content records are transmitted to describe the available content and allow the local receiver unit (IRD) 36 to build the program guide.

Figure 3:
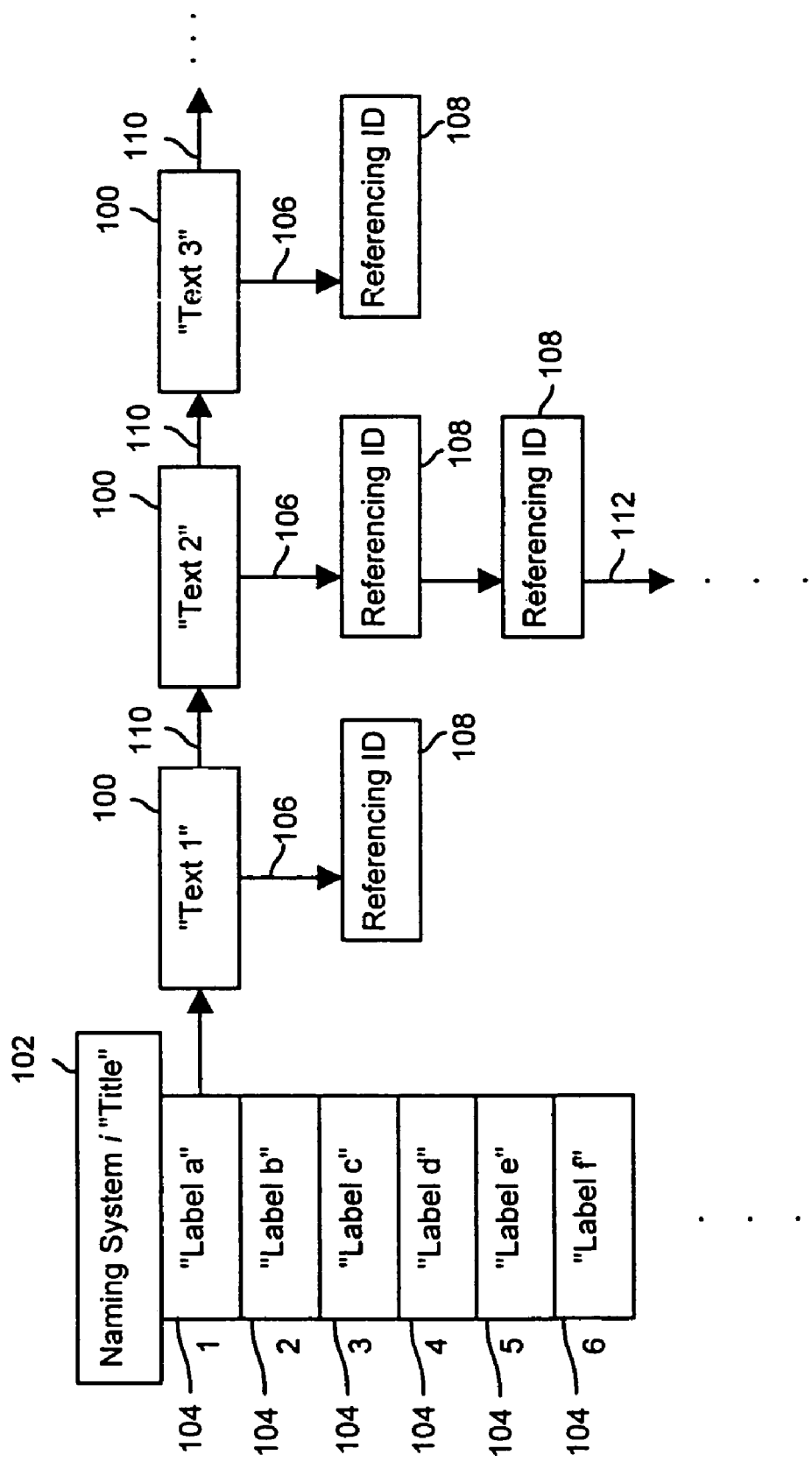
FIG. 3 is a block diagram illustrating a generic example of stored data according to the method of the present invention.

FIG. 3 illustrates one embodiment of the present invention for receiving and storing content records 100, such as the program guide data, at the local receiver unit (IRD) 36. Digital content records 100 are used to create informational displays in the program guide. For example, if a user requests a list of actors staring in a particular movie, a display could be created containing such a list. Preferably, content records 100 are accompanied by an associated title 102 and label 104. A title categorizes a group of labels, and a label further categorizes a group of content records. For example, the content "John Smith" may be accompanied by the title 102 "Credits" and the label 104 "Director". A reference pointer 106 in the content record 100 indicates a referencing display object 108 such as a channel, program, or web page object. A next content pointer 110 in the content record 100 (or label 104) indicates another content record 100 that is associated with the same label 104. Similarly, a next reference pointer 106 in a referencing object 108 indicates another referencing object 108 that is associated with the same content record 100. All referencing objects 108 linked from the same title 102, label 104, and content record 100 share a common reference to that title 102, label 104, and content record 100 mode (e.g., Credits.Actor.John_Doe). Additionally, as shown in FIG. 3, one or more referencing objects 108 may include reference pointers 112 that point to further information, such as referencing objects, etc.

Figure 4:
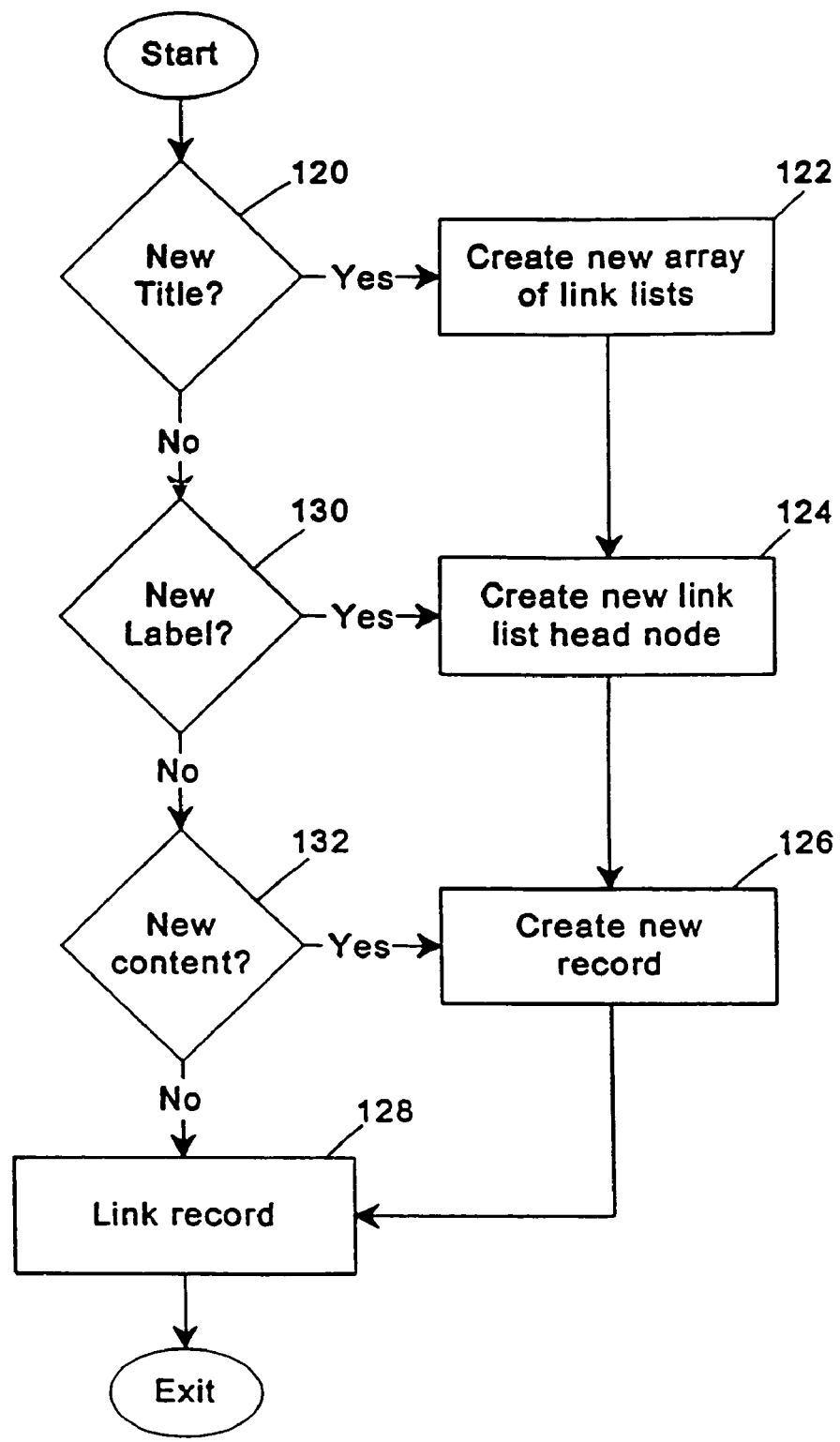
FIG. 4 is a flowchart illustrating an embodiment of a method that can be implemented by the local receiver of FIG. 2 to store content records.
Figure 5:
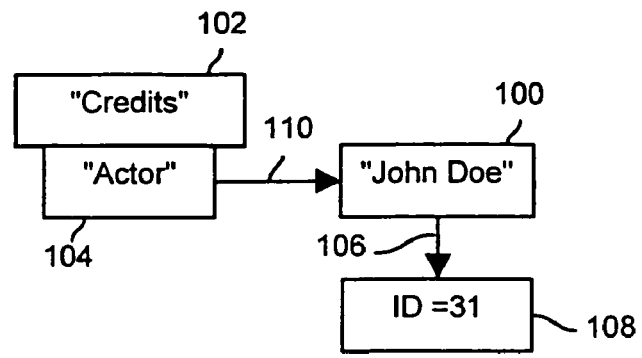
FIG. 5 is a block diagram of a specific example of stored data according to the method of the present invention.
Figure 10:
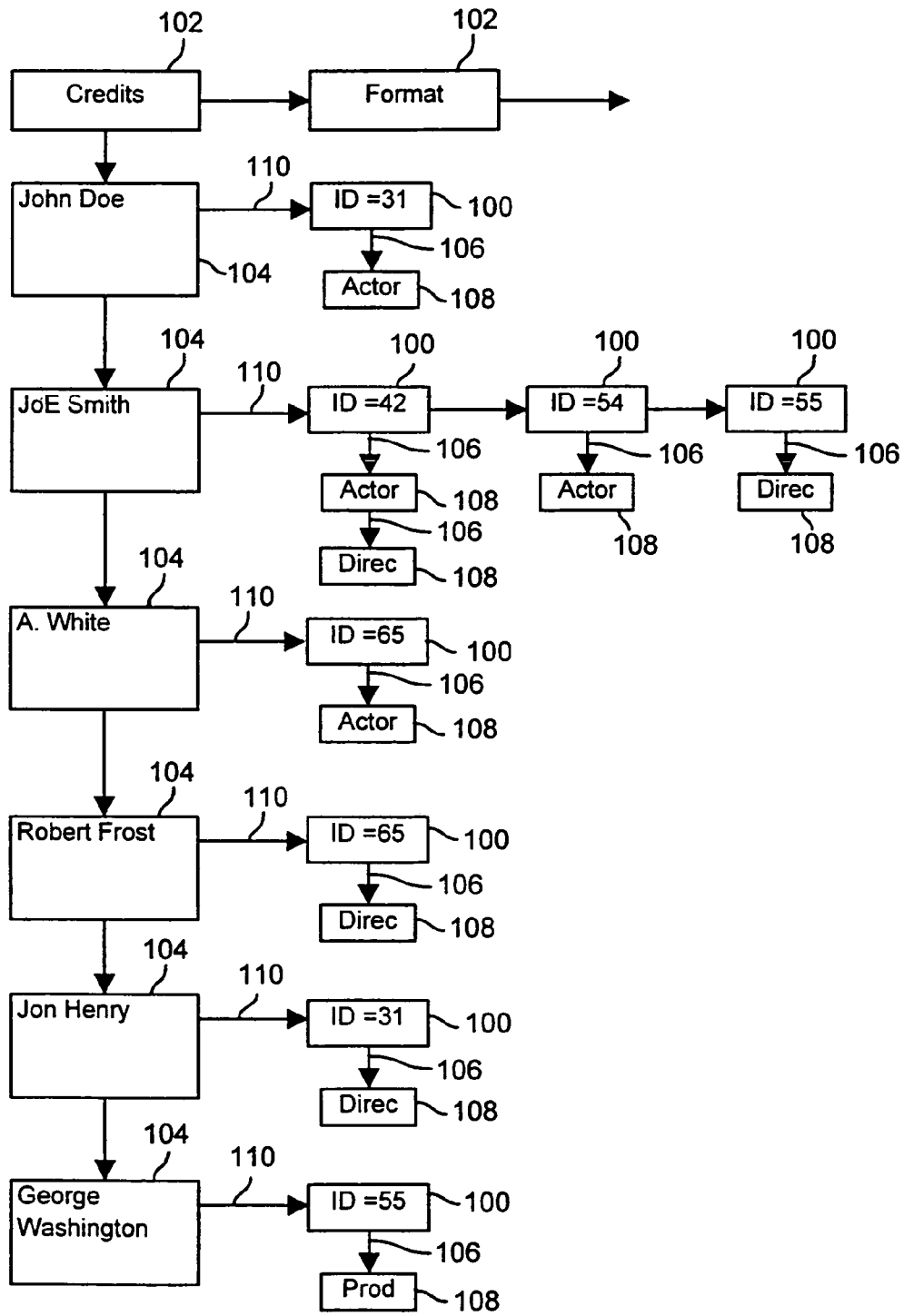
FIG. 10 is a block diagram of a specific example of stored data according to the method of the present invention wherein a person's name is used as the primary key.

Content records 100 may be stored as they are received. A flowchart of a program that can be implemented by the local receiver unit (IRD) 36 to store content records 100 in accordance with the teachings of the present invention is illustrated in FIG. 4. The programmed steps may be performed by a control circuit such as a microprocessor 58. Once the program is initiated the control circuit determines if the current message is associated with a new title 102 (block 120). For example, if there are no content records 100 currently stored and a message is received to store the content "John Doe" as an "Actor" under "Credits" for the referring program ID=31 (see FIG. 5), then the control circuit would create a new title 102 (e.g., an array of linked lists or a linked list of linked lists) called "Credits" (block 122). Subsequently, the control circuit would insert a new label 104 (e.g., a head node) called "Actor" into the "Credits" title (block 124). Further, the control circuit would create a new content record 100 containing "John Doe" (block 126) and the control circuit would link the content record 100 to the "Actor" label 104 and the referencing object 108 (block 128) containing a reference to ID=31. Because this is the first content record 100 under this newly created label, linking preferably comprises setting a next content pointer 110 in the label head node to point to the content record 100 and setting a reference pointer 106 in the content record 100 to point to a referencing object 108 (e.g., ID=31). Persons of ordinary skill in the art will readily appreciate that an actor's name (e.g., "John Doe") could be used as a label (e.g., head node) to allow easier retrieval of data by name (e.g., "All movies with John Doe"). A preferred embodiment of using an actor's name as a label is shown in FIG. 10 and discussed in detail below.

Figure 6:
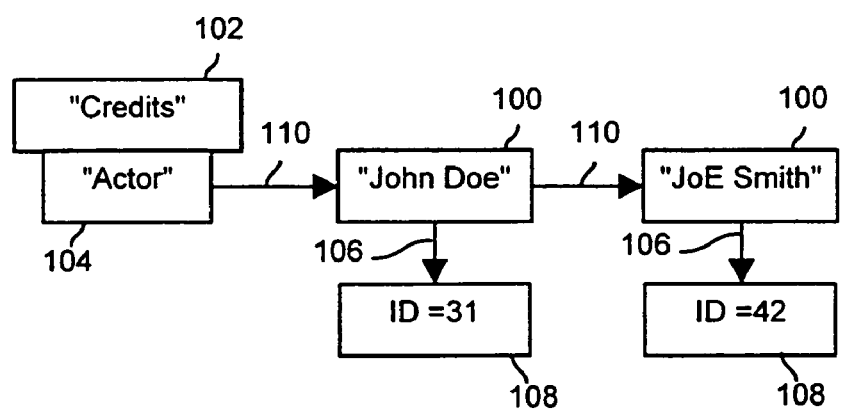
FIG. 6 is a block diagram of a specific example of stored data according to the method of the present invention expanded from the example of FIG. 5.

In the event that the title 102 already exists (block 120), the control circuit then checks if the content record 100 to be saved is associated with a new label 104 (block 130). If the current content record 100 is not associated with a new label 104, the control circuit checks if it is associated with new content (block 132). If the current content record 100 is not associated with a new label 104, but is new content, then the control circuit creates a new content record 100 (block 126) and links it (block 128). However, if this is not the first content record 100 under this label, linking preferably comprises setting a next content pointer 110 in the last content record 100 in this label's link list to point to the new content record 100. As before, the control circuits sets a reference pointer 106 in the content record 100 to point to a referencing object 108 (e.g., ID=42). An example of the results is illustrated in FIG. 6. Alternatively, the new content record 100 could be inserted somewhere in the existing link list (e.g., alphabetical order).

Figure 7:
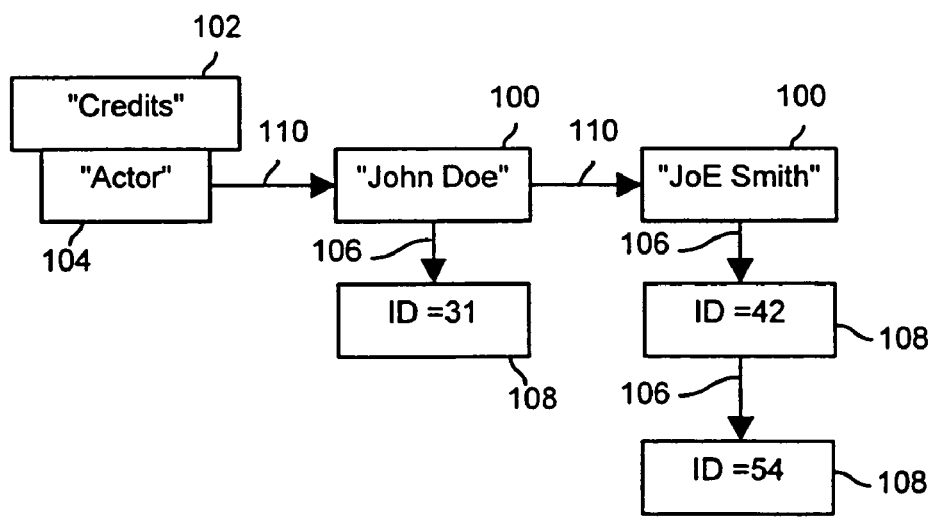
FIG. 7 is a block diagram of a specific example of stored data according to the method of the present invention expanded from the example of FIG. 6.

If the current content record 100 is not associated with a new label 104 (block 130); and, the current content record 100 is not new content (block 132), then the control circuits sets a reference pointer 106 in the last referencing object 108 of this content record's link list to point to the new referencing object 108 (block 128). An example of the results is illustrated in FIG. 7. Alternatively, the new referencing object 108 could be inserted somewhere in the existing link list (e.g., alphabetical order).

Figure 8:
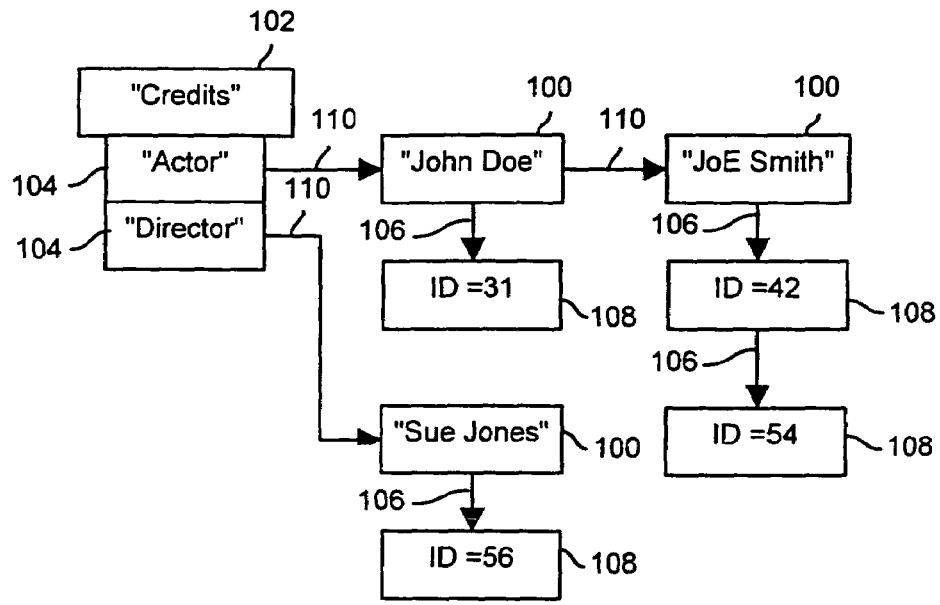
FIG. 8 is a block diagram of a specific example of stored data according to the method of the present invention expanded from the example of FIG. 7.

In the event that the current content record 100 is associated with a new label 104, but an existing title 102 (block 130), a new label (e.g., head node) is created in the existing title 102, preferably by inserting a new link list head node into the an existing array (or linked list) of linked lists (block 124). As before, the new content record 100 would be created (block 126) linked (block 128). An example of the results is illustrated in FIG. 8.

Figure 9:
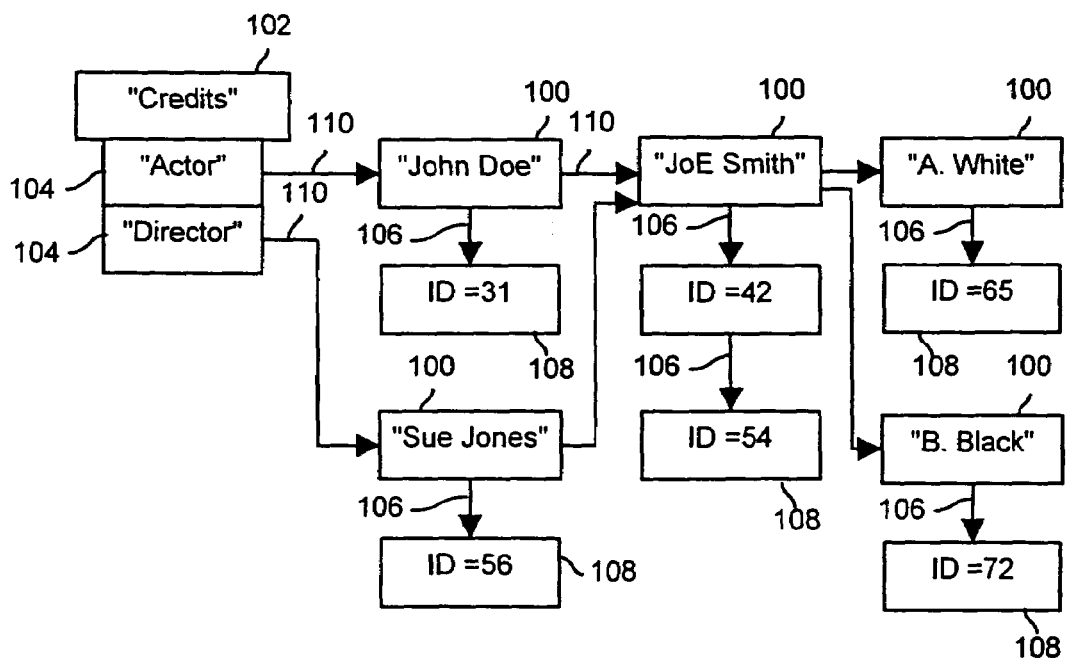
FIG. 9 is a block diagram of a specific example of stored data according to the method of the present invention expanded from the example of FIG. 8.

In some instances, a particular content record 100 may be a member of more then one linked lists. In one embodiment, the content record 100 may simply be repeated in each linked list. However, in an effort to reduce the amount of memory 70 required for content record 100 storage, multiple content pointers 110 may be used. For example, if "Joe Smith" is both an "Actor" and a "Director", then the same content record 100 may be linked into both lists (see FIG. 9). However, having two (or more) content pointers 110 emanating from the same content record 100 requires additional overhead in the content record 100.

Several methods of optimizing the increased content record 100 overhead may be employed. In one embodiment, content pointers 110 are added to content records 100 on the fly as needed. For example, each content record 100 illustrated in FIG. 8 has only one content pointer 110 (although the content pointer 110 associated with the last content record 100 containing "Joe Smith" is unused and, therefore, not shown). Subsequently, the "Joe Smith" content record 100 requires two content pointers 110 (see FIG. 9). Accordingly, in this embodiment, a "Director" content pointer 110 may be added to all the content records 100, even though the new content pointer 110 is unused in all the content records 100 except the one that created the need (i.e., the "Joe Smith" content record 100).

When each content record 100 has only one content pointer 110 (as in FIG. 8), there is no need to label the subsequent content pointers 110. It is implied that the label 104 of origin presides. However, when additional content pointers 110 are employed (as in FIG. 9), the reference back to the label 104 would be lost without additional data. In one embodiment, all of the content pointers 110 carry a label 104. In another embodiment, one or more of the labels may be implied by the position of the content pointer 110. For example, the user may select three out of a possible thirty labels 104 to track. In this example, three content pointers 110 would be included with every content record 100 and the associated label need only be stored once (e.g., in a user preferences file). In another embodiment, a bitmap associated with each content record 100 may indicate which subset of labels are used by a content record 100. For example, if there are a total of sixteen possible labels 104, and each content record 100 typically only uses a few of them, then a two byte bit map could indicate the label 104 associated with any attached content pointers 110, thereby conserving memory associated with unused content pointers 110 (e.g., only one bit of overhead for each unused content pointers 110). In yet another embodiment, a single flag could be used to indicate if a particular content record 100 is using a short format or a long format. Preferably, the short format would maximize the efficiency of the majority of the content records 100 (e.g., one implied label associated with one content pointer 110). The long format would then maximize the efficiency of the next largest group using any of the techniques described herein (e.g., completely label each content pointer 110). A person of ordinary skill in the art will readily appreciate that any number of formats and combinations may be employed.

In the preferred embodiment (see FIG. 10), a person's name is the primary key (i.e., the label 104). In this manner, an unlimited number of credit types (e.g., actor, director, producer, etc.) may be used without additional overhead associated with unused content pointers 110, because adding data does not impact the format of the data structure.

FIG. 10 illustrates each referenced object having a linked list of the labels that are attributed with that object's relationship to the text. These labels could be represented either symbolically, using the label name (as depicted in FIG. 10) or by an ordinal position of the label within the title system (e.g., "Actors" is index 0, "Directors" is index 1, and so on, within the "Credits" system).

Figure 11:
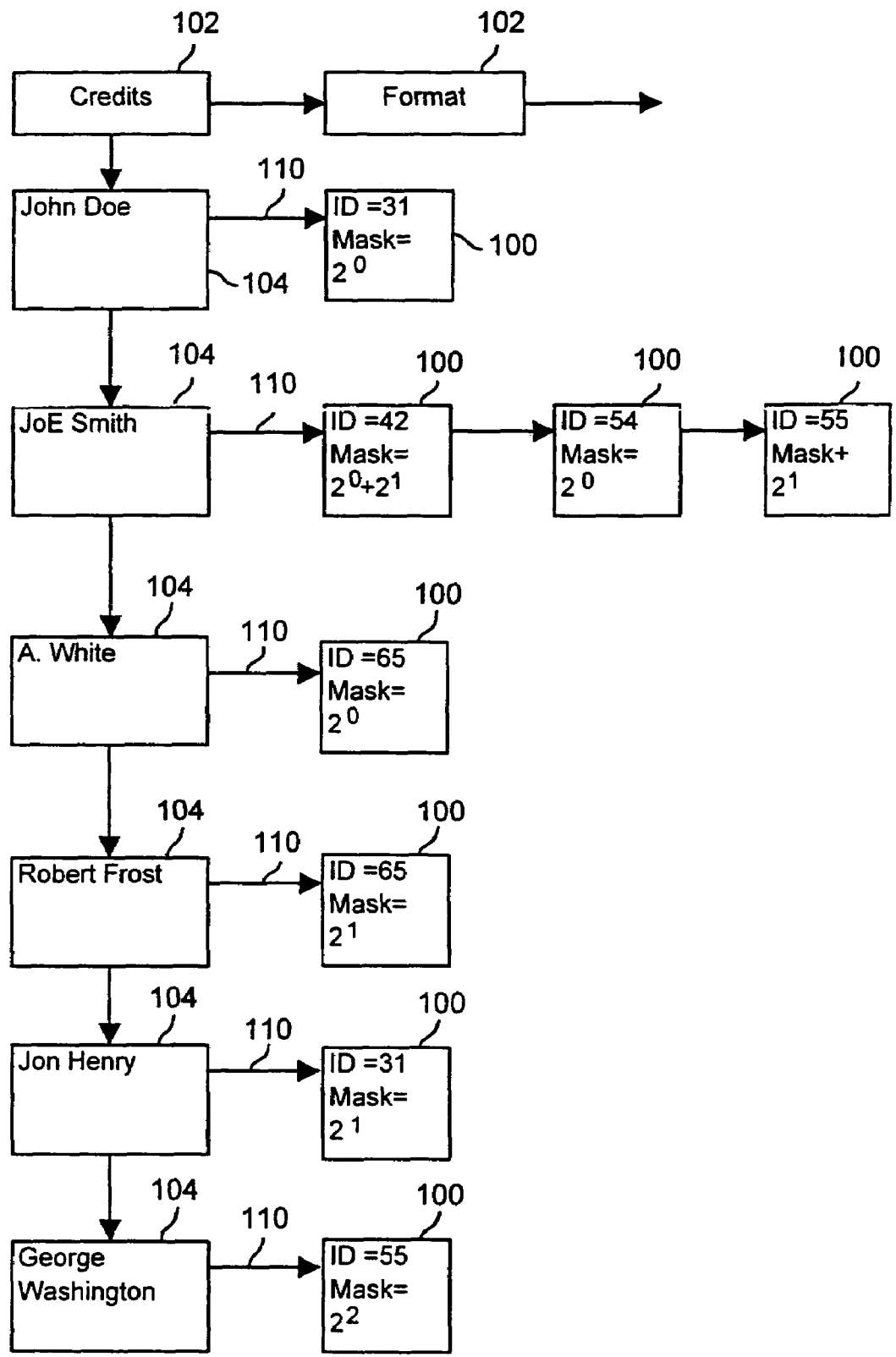
FIG. 11 is a block diagram of a specific example of stored data according to the present invention wherein bitmasks are used.

Alternatively, a bitmask could be used (see FIG. 11). Each bit in the bitmask could represent a single label, and then each referenced object ID could indicate its relationship to the text by setting the bits appropriately. For example, bit $2^0$ could be set to indicate a relationship between "Director" and the object to the text item. This system does not need to have a dynamic linked list to represent the number of relationships, which simplifies the data organization. Although the size of the bitmask limits the total number of possible labels that can be represented to the number of bits available in the bitmask. Dynamically resizing the bitmask to hold more labels is an option for expansion.

Figure 12:
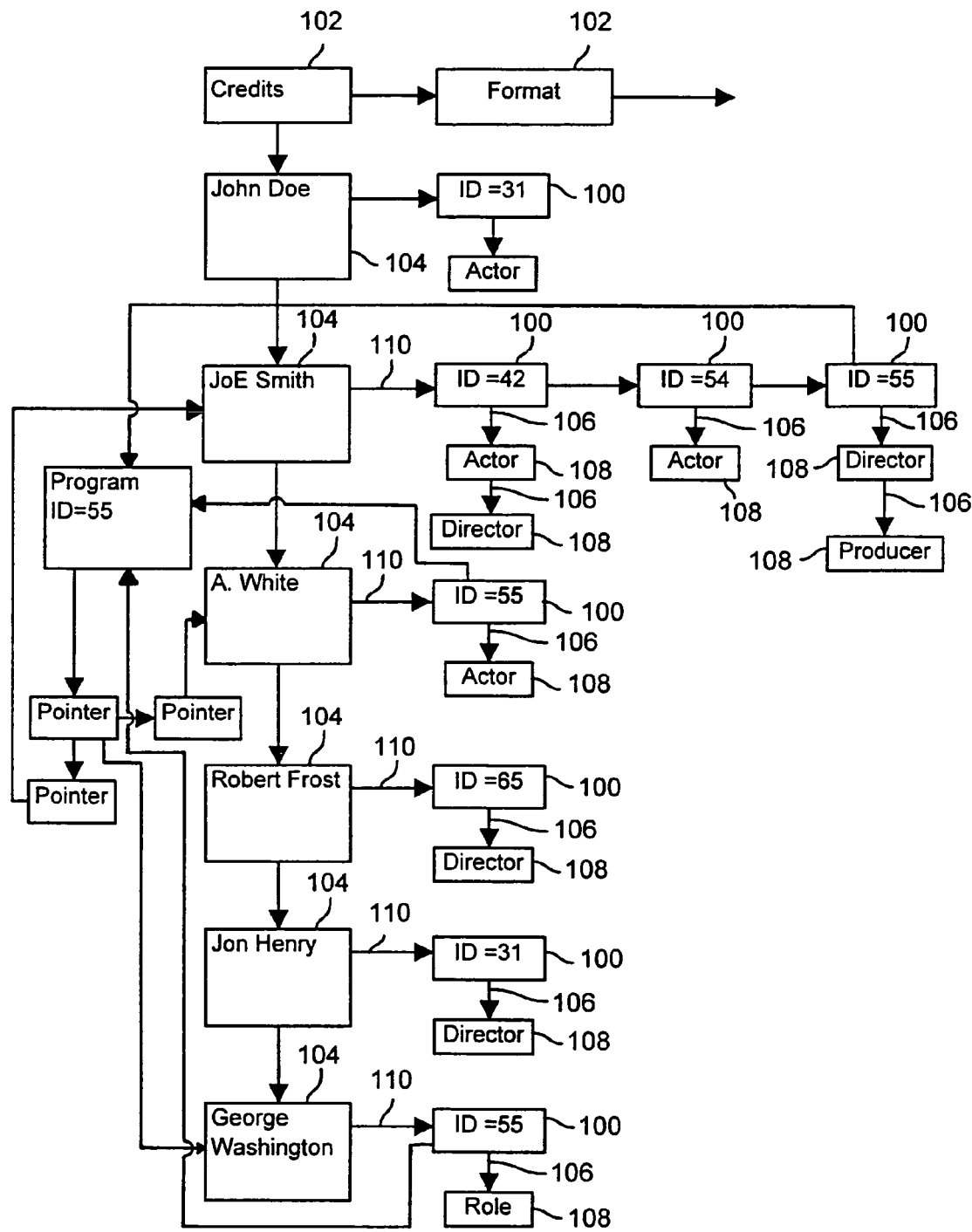
FIG. 12 is a block diagram of a specific example of stored data according to the method of the present invention expended from the example of FIG. 10.

FIG. 12 illustrates how the IDs in the naming system actually contain a pointer or another means to index back to the referring object. The figure also illustrates how an object has a list of pointers or another means to index to the text. By scanning the list of IDs in the linked per referenced text item, the application can construct the relationships from the manner in which that are stored. In this example, the program ID 55 is associated with the actor A. White who plays the role of George Washington. The movie was directed and produced by Joe Smith.

Eventually, referencing objects are deleted by the system. As time moves forward, the electronic program guide is updated. Accordingly, referencing objects 108 associated with shows in the past may be deleted to conserve memory (e.g., a particular movie is no longer showing at any time). As referencing objects 108 are no longer needed and removed from the system, the corresponding reference pointers 106 may be removed. When a content record 100 has no referencing objects 108, it too may be removed to conserve memory. Similarly, when a label 104 has no content records 100, it too may be removed. Further, a title with no labels may be deleted. In this way data structures are created and removed on the fly to create a flexible and memory efficient storage system.

In summary, persons of ordinary skill in the art will readily appreciate that a naming system and method have been provided. Users of systems implementing the teachings of the present invention can enjoy increased efficiency in memory usage, increased database search speed, and/or dynamic field names.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. An apparatus for storing digital content records used to create informational displays in an electronic television program guide, the apparatus comprising:
    a receiver for receiving a first content record;
    a memory for storing the first content record; and
    a control circuit operatively coupled to the receiver and the memory, wherein the control circuit is configured to determine (a) if the first content record is new; (b) if the first content record is associated with a new label that categorizes the first content record; and (c) if the first content record is associated with a tide that categorizes the new label.

2. An apparatus as defined by claim 1, wherein the control circuit is configured to create a new storage category based on the new label.

3. An apparatus as defined by claim 2, wherein the control circuit is configured to set a reference pointer associated with the first content record pointing to a referencing display object.

4. An apparatus as defined by claim 3, wherein the control circuit is configured to set a first content pointer associated with the first content record pointing to a second content record associated with the new label.

5. An apparatus as defined in claim 4, wherein the control circuit is configured to create a new title comprising an array of linked lists.

6. An apparatus as defined in claim 5, wherein the control circuit is configured to insert a head node into the array of linked lists indicative of the new label.

7. An apparatus as defined in claim 6, wherein the control circuit is configured to set a second content pointer in the head node pointing to the first content record.

8. An apparatus as defined in claim 1, wherein the receiver comprises a direct to home satellite receiver.

9. An apparatus as defined in claim 1, wherein the control circuit is configured to create a new title comprising a linked list of linked lists.

10. An apparatus as defined in claim 9, wherein the control circuit is configured to insert a head node into the linked list of linked lists indicative of the label.

11. An apparatus as defined in claim 1, wherein the first content record comprises a reference pointer.

12. A method of storing digital content records used to create informational displays in an electronic television program guide, the method comprising:
    receiving a first content record from a receiver;
    determining if the first content record is new;
    determining if the first content record is associated with a new label that categorizes the first content record; and
    determining if the first content record is associated with a title that categorizes the new label.

13. A method as defined by claim 12, comprising creating a new storage category based on the new label.

14. A method as defined by claim 13, comprising setting a reference pointer associated with the first content record pointing to a referencing display object.

15. A method as defined by claim 14, comprising setting a first content pointer associated with the first content record pointing to a second content record associated with the new label.

16. A method as defined by claim 15, comprising inserting a head node into the array of linked lists indicative of the new label.

17. A method as defined in claim 16, comprising setting a second content pointer in the head node pointing to the first content record.

18. A method as defined by claim 12, comprising creating a new title comprising an array of linked lists.

19. A method as defined by claim 12, comprising creating a new title comprising a linked list of linked lists.

20. A method as defined in claim 19, comprising inserting a head node into the linked list of linked lists indicative of the new label.

* * * * *